(12) United States Patent
Yanagisawa et al.

(10) Patent No.: US 10,290,424 B2
(45) Date of Patent: May 14, 2019

(54) MULTILAYER CERAMIC CAPACITOR AND MANUFACTURING METHOD OF MULTILAYER CERAMIC CAPACITOR

(71) Applicant: TAIYO YUDEN CO., LTD., Chuo-ku, Tokyo (JP)

(72) Inventors: Atsuhiro Yanagisawa, Takasaki (JP); Yoshinori Shibata, Takasaki (JP); Mikio Tahara, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/836,657

(22) Filed: Dec. 8, 2017

(65) Prior Publication Data

US 2018/0174752 A1   Jun. 21, 2018

(30) Foreign Application Priority Data

Dec. 21, 2016  (JP) ................. 2016-248519

(51) Int. Cl.
| | |
|---|---|
| *H01G 4/008* | (2006.01) |
| *H01G 4/12* | (2006.01) |
| *H01G 4/232* | (2006.01) |
| *H01G 4/30* | (2006.01) |

(52) U.S. Cl.
CPC .......... *H01G 4/2325* (2013.01); *H01G 4/008* (2013.01); *H01G 4/12* (2013.01); *H01G 4/30* (2013.01)

(58) Field of Classification Search
CPC ...... C23C 14/34; C23C 14/185; H01G 4/005; H01G 4/008; H01G 4/12; H01G 4/1209; H01G 4/232; H01G 4/302; H01G 4/306; H01G 4/2325; H01G 4/30

USPC ............................................ 361/321.4, 301.4
See application file for complete search history.

(56) References Cited

U.S. PATENT DOCUMENTS

| | | | | |
|---|---|---|---|---|
| 4,604,676 A | * | 8/1986 | Senda ................. | H01G 4/2325 361/309 |
| 2009/0225494 A1 | * | 9/2009 | Yamazaki .............. | B32B 18/00 361/321.4 |
| 2016/0086733 A1 | | 3/2016 | Saito et al. | |
| 2016/0189865 A1 | * | 6/2016 | Kawamura ............. | H01G 4/30 361/301.4 |
| 2016/0254094 A1 | * | 9/2016 | Lee ......................... | H01G 4/30 361/301.4 |

(Continued)

FOREIGN PATENT DOCUMENTS

| | | |
|---|---|---|
| JP | H0180011 A | 3/1989 |
| JP | 2016066783 A | 4/2016 |

*Primary Examiner* — Timothy J Thompson
*Assistant Examiner* — Guillermo J Egoavil
(74) *Attorney, Agent, or Firm* — Law Office of Katsuhiro Arai (57) ABSTRACT

A multilayer ceramic capacitor includes: a multilayer chip having a parallelepiped shape in which each of a plurality of dielectric layers and each of a plurality of internal electrode layers are alternately stacked and are alternately exposed to two edge faces of the multilayer chip, a main component of the plurality of dielectric layers being a ceramic; and a pair of external electrodes that are formed on the two edge faces; wherein: the pair of external electrode have a structure in which a plated layer is formed on a ground layer; a main component of the ground layer is a metal or an alloy including at least one of Ni and Cu; and the ground layer includes Mo.

12 Claims, 5 Drawing Sheets

(56) References Cited

U.S. PATENT DOCUMENTS

2017/0345566 A1* 11/2017 Tanaka .................. H01G 4/005
2018/0068797 A1* 3/2018 Chigira ................. H01G 4/008

* cited by examiner

MULTILAYER CERAMIC CAPACITOR AND MANUFACTURING METHOD OF MULTILAYER CERAMIC CAPACITOR

CROSS-REFERENCE TO RELATED APPLICATION

This application is based upon and claims the benefit of priority of the prior Japanese Patent Application No. 2016-248519, filed on Dec. 21, 2016, the entire contents of which are incorporated herein by reference.

FIELD

A certain aspect of the present invention relates to a multilayer ceramic capacitor and a manufacturing method of a multilayer ceramic capacitor.

BACKGROUND

A multilayer ceramic capacitor has a multilayer structure in which a plurality of dielectric layers and a plurality of internal electrode layers are alternately stacked, and a pair of external electrodes that are formed on edge faces of the multilayer structure and are electrically coupled to the internal electrode layers extracted to the edge faces. The external electrode has a structure in which a ground layer is subjected to a plating. Japanese Patent Application Publication No. H01-80011 discloses that hydrogen generated in the plating is adsorbed in the internal electrode layer and an insulating desistance of the dielectric layer is degraded by reduction caused by the hydrogen. And the patent document discloses that Ni (nickel) is added as a metal for suppressing hydrogen adsorption to the internal electrode of which a main component is a noble metal. On the other hand, Japanese Patent Application Publication No. 2016-66783 discloses the insulating resistance is degraded because of influence of hydrogen even if Ni is used for the internal electrode layer.

SUMMARY OF THE INVENTION

It is demanded that hydrogen intrusion from the external electrode acting as an intrusion path of the hydrogen is suppressed, in order to suppress the influence of hydrogen.

The present invention has a purpose of providing a multilayer ceramic capacitor and a manufacturing method of the multilayer ceramic capacitor that are capable of suppressing hydrogen intrusion from an external electrode.

According to an aspect of the present invention, there is provided a multilayer ceramic capacitor including: a multilayer chip having a parallelepiped shape in which each of a plurality of dielectric layers and each of a plurality of internal electrode layers are alternately stacked and are alternately exposed to two edge faces of the multilayer chip, a main component of the plurality of dielectric layers being a ceramic; and a pair of external electrodes that are formed on the two edge faces; wherein: the pair of external electrode have a structure in which a plated layer is formed on a ground layer; a main component of the ground layer is a metal or an alloy including at least one of Ni and Cu; and the ground layer includes Mo.

According to another aspect of the present invention, there is provided a manufacturing method of a multilayer ceramic capacitor including: forming a ceramic multilayer structure having a parallelepiped shape in which each of a plurality of ceramic dielectric green sheets and each of a plurality of conductive pastes for forming an internal electrode are alternately stacked and are alternately exposed to two edge faces of the ceramic multilayer structure; coating a metal paste on the two edge faces, the metal paste contacting to the two edge faces, the metal paste including a metal powder and a Mo source, a main component of the metal powder being a metal or an alloy including at least one of Ni and Cu; and baking the ceramic multilayer structure after the coating.

DETAILED DESCRIPTION

A description will be given of an embodiment with reference to the accompanying drawings.

Embodiment

Figure 1:
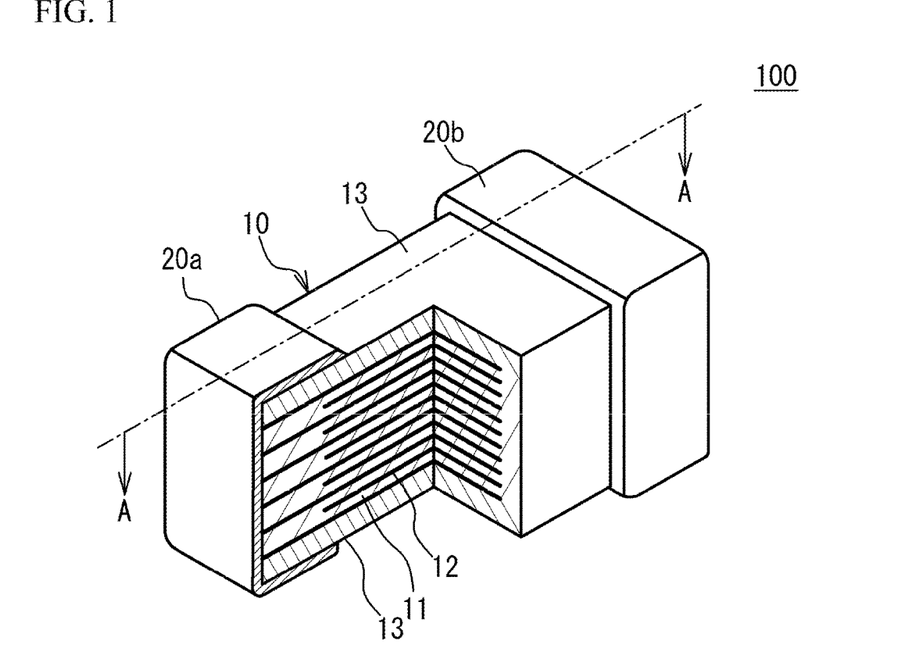
FIG. 1 illustrates a partial perspective view of a multilayer ceramic capacitor.

A description will be given of a multilayer ceramic capacitor. FIG. 1 illustrates a partial perspective view of a multilayer ceramic capacitor 100. As illustrated in FIG. 1, the multilayer ceramic capacitor 100 includes a multilayer chip 10 having a rectangular parallelepiped shape, and a pair of external electrodes 20a and 20b that are respectively provided at two edge faces of the multilayer chip 10 facing each other. Four faces of the multilayer chip 10 other than the two edge faces are referred to as side faces. The external electrodes 20a and 20b extend to the four side faces. However, the external electrodes 20a and 20b are spaced from each other on the four side faces.

The multilayer chip 10 has a structure designed to have dielectric layers 11 and internal electrode layers 12 alternately stacked. The dielectric layer 11 includes ceramic material acting as a dielectric material. End edges of the internal electrode layers 12 are alternately exposed to a first edge face of the multilayer chip 10 and a second edge face of the multilayer chip 10 that is different from the first edge face. In the embodiment, the first face faces with the second face. The external electrode 20a is provided on the first edge face. The external electrode 20b is provided on the second edge face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In the multilayer chip 10, both edge faces in the stack direction of the dielectric layers 11 and the internal electrode layers 12 (hereinafter referred to as stack direction) are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.2 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of noble metal such as platinum (Pt), palladium (Pd), silver (Ag), gold (Au) or alloy thereof. The dielectric layers 11 are mainly composed of barium titanate ($BaTiO_3$) having a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure.

Figure 2:
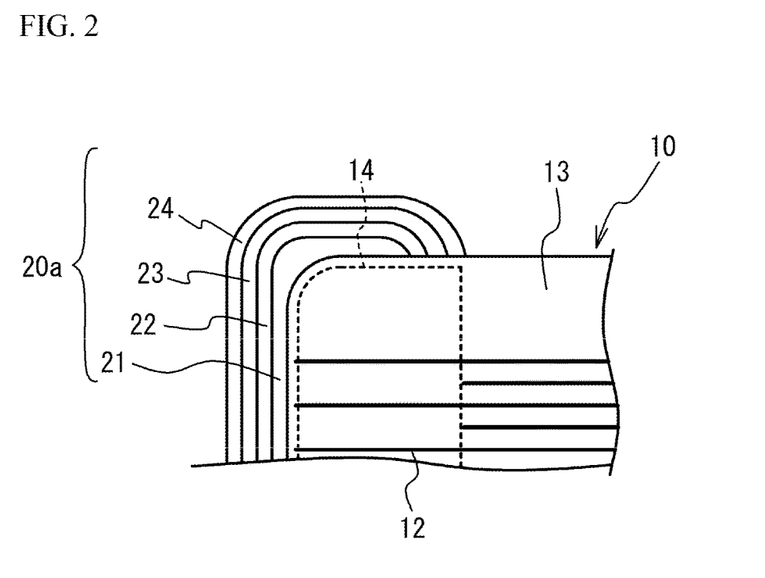
FIG. 2 illustrates a cross sectional view taken along a line A-A of FIG. 1.

FIG. 2 illustrates a cross sectional view of the external electrode 200 and is a cross sectional view taken along a line A-A of FIG. 1. In FIG. 2, hatching for cross section is omitted. As illustrated in 2, the external electrode 200 has a structure in which a Cu-plated layer 22, a Ni-plated layer 23 and a Sn-plated layer 24 are formed on a ground layer 21 in this order. The ground layer 21, the Cu-plated layer 22, the Ni-plated layer 23 and the Sn-plated layer 24 extend toward the four side faces of the multilayer chip 10 from the both edge faces of the multilayer chip 10. In FIG. 2, the external electrode 20a is illustrated. However, the external electrode 20b has the same structure as the external electrode 20b.

A main component of the ground layer 21 is a metal or an alloy including at least one of Ni and Cu. The ground layer 21 may include a glass component for densifying the ground layer 21 or a co-material for controlling sinterability of the ground layer 21. The glass component is an oxide such as Ba, Sr, Ca, Zn (zinc), Al (aluminum), Si (silicon), B (boron) or the like. The co-material is a ceramic component. For example, the co-material is a ceramic component that is a main component of the dielectric layer 11.

The ground layer 21 includes Mo (molybdenum). When the Cu-plated layer 22, the Ni-plated layer 23 and the Sn-plated layer 24 are formed, hydrogen is generated. However, when the ground layer 21 includes Mo, intrusion of the hydrogen into the internal electrode layer 12 is suppressed. For example, Mo has a function of preventing hydrogen permeation. It is thought that an intrusion path of the hydrogen is blocked (blocking effect is achieved), because the ground layer 21 include Mo preventing the hydrogen permeation, Mo diffuses into a ceramic region 14 near the external electrodes 20a and 20b with a concentration gradient, and permeability of the hydrogen in the ground layer 21 and the ceramic region 14 is reduced. The ceramic region 14 is a partial region of the multilayer chip 10 and is a region on each edge face side with respect to a capacity region in which the internal electrode layers 12 connected to different external electrodes face with each other. When the intrusion path of hydrogen is blocked, adsorption of the hydrogen into the internal electrode layer 12 is suppressed and reduction of the dielectric layer 11 is suppressed. Thus, the decrease of the insulating resistance of the multilayer ceramic capacitor 100 is suppressed. In the plating process of the Cu-plated layer 22 and the Ni-plated layer 23, a lot of hydrogen is generated at a surface subjected to the plating. Therefore, it is specifically effective to block the intrusion path of hydrogen.

When a part of Mo in the ground layer 21 diffuses into the dielectric layer 11, the diffused Mo is replaced with the B site of the perovskite structure expressed by $ABO_3$ and acts as a donor. Therefore, generation of an oxygen defect in the ceramic structuring the dielectric layer 11 is suppressed. Accordingly, reduction resistance of the dielectric layer 11 is enhanced. In the embodiment, Mo included in the ground layer 21 is focused on. However, the structure is not limited. Another element that has a function preventing the hydrogen permeation, is replaced with the B site and acts as a donor may be used instead of Mo. The element is such as Nb (niobium), Ta (tantalum), W (tungsten) or the like.

When a main component of the internal electrode layer 12 is Ni, the hydrogen adsorption of the internal electrode layer 12 is enhanced. Therefore, when the main component of the internal electrode layer 12 is Ni, it is specifically effective to suppress the hydrogen intrusion from the external electrodes 20a and 20b. In the plating process of the Cu-plated layer 22 and the Ni-plated layer 23, a lot of hydrogen is generated at the surface subjected to the plating process. Therefore, it is specifically effective to block the intrusion path of hydrogen.

Sn has high compactness. This is because Sn has a closest packing structure. When the Sn-plated layer 24 is formed on the ground layer 21, hydrogen is confined on the multilayer chip 10 side with respect to the Sn-plated layer 24. That is, influence of the hydrogen tends to occur. Therefore, when the Sn-plated layer 24 is formed on the ground layer 21, it is specifically effective to suppress intrusion of hydrogen from the external electrodes 20a and 20b.

Figure 3:
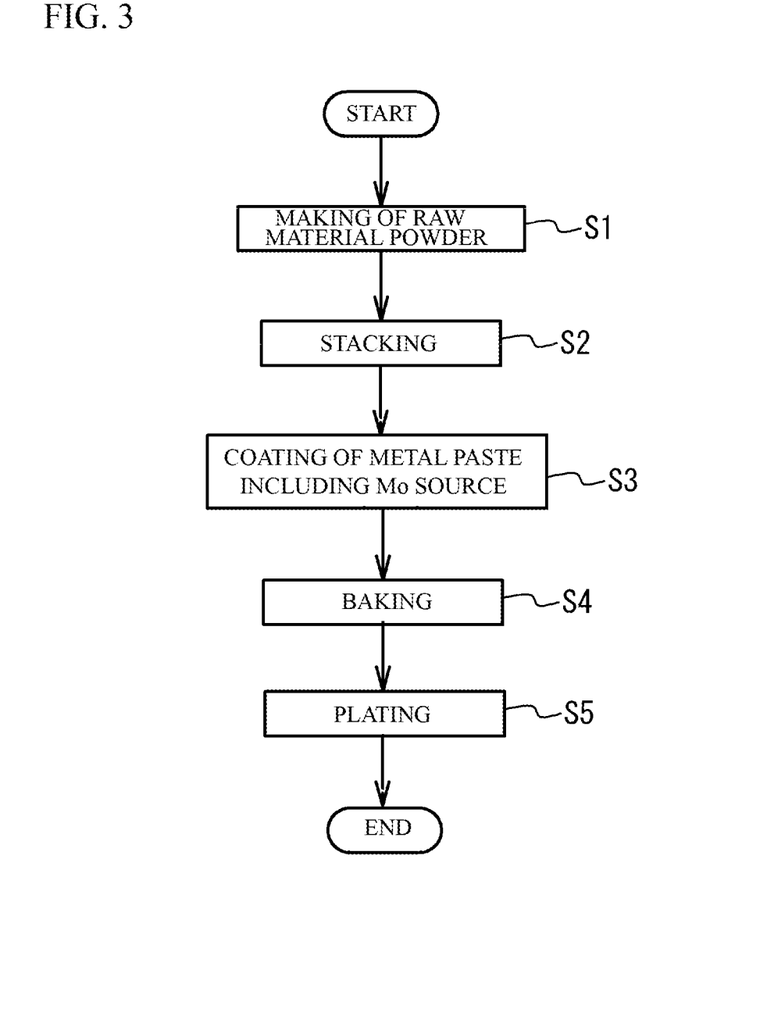
FIG. 3 illustrates a flowchart of a manufacturing method of a multilayer ceramic capacitor.

Next, a description will be given of a manufacturing method of the multilayer ceramic capacitor 100. FIG. 3 illustrates a manufacturing method of the multilayer ceramic capacitor 100.

[Making Process of Raw Material Powder]

Additive compound may be added to ceramic powder that is a main component of the dielectric layer 11, in accordance with purposes. The additive compound may be an oxide of Mg (magnesium), Mn (manganese), V (vanadium), Cr (chromium) or a rare earth element (Y (yttrium), Dy (dysprosium), Tm (thulium), Ho (holmium), Tb (terbium), Yb (ytterbium), Sm (samarium), Eu (europium), Gd (gadolinium) and Er (erbium)), or an oxide of Co (cobalt), Ni, Li (lithium), B, Na (sodium), K (potassium) and Si, or glass. For example, compound including additive compound is added to ceramic material powder and is calcined. Next, the resulting ceramic material grains are wet-blended with additive compound, is dried and is crushed. Thus, the ceramic material powder is adjusted.

[Stacking Process]

Next, a binder such as polyvinyl butyral (PVB) resin, an organic solvent such as ethanol or toluene, and a plasticizer such as dioctyl phthalate (DOP) are added to the resulting ceramic powder and wet-blended. With use of the resulting slurry, a strip-shaped dielectric green sheet with a thickness of 0.8 μm or less is coated on a base material by, for example, a die coater method or a doctor blade method, and then dried.

Then, a pattern of the internal electrode layer 12 is provided on the surface of the dielectric green sheet by printing a conductive paste for forming the internal electrode with use of screen printing or gravure printing. The conductive paste includes powder of the main component metal of the internal electrode layer 12, a binder, a solvent, and additives as needed. It is preferable that the binder and the solvent are different from those of the above-mentioned ceramic slurry. As a co-material, the ceramic material that is the main component of the dielectric layer 11 may be distributed in the conductive paste.

Then, the dielectric green sheet on which the internal electrode layer pattern is printed is stamped into a predetermined size, and a predetermined number (for example, 200 to 500) of stamped dielectric green sheets are stacked while the base material is peeled so that the internal electrode layers 12 and the dielectric layers 11 are alternated with each other and the end edges of the internal electrode layers 12 are alternately exposed to both edge faces in the length direction of the dielectric layer so as to be alternately led out to a pair of external electrodes of different polarizations. Cover sheets, which are to be the cover layers 13, are compressed on the stacked green sheets and under the stacked sheets. The resulting compact is cut into a predetermined size (for example, 1.0 mm×0.5 mm). Thus, a ceramic multilayer structure having a rectangular parallelepiped shape is obtained.

[Coating Process of a Metal Paste]

Next, the binder is removed from the ceramic multilayer structure made in the stacking process in $N_2$ atmosphere in a temperature range of 250 degrees C. to 500 degrees C. After that, a metal paste including a metal filler, the co-material, the binder and the solvent is coated from the both edge faces of the ceramic multilayer structure to each side face and is dried. The metal paste is used for forming the external electrodes.

Next, the metal paste B including the metal filler, the binder and the solvent is coated from on the metal paste A to each side face of the ceramic multilayer structure and is dried. The metal paste B does not include the co-material.

A type, a shape or the like of the Mo source is not limited. For example, in concrete, molybdenum oxide ($MoO_2$, $MoO_3$), molybdenum chloride ($MoCl_2$, $MoCl_3$, $MoCl_4$), molybdenum hydroxide ($Mo(OH)_3$, $Mo(OH)_5$), barium molybdate ($BaMoO_4$), ammonium molybdate (($NH_4$)$_6Mo_7O_{24}\cdot 4H_2O$), molybdenum-nickel alloy, or the like may be used as the Mo source. A co-material in which Mo is dissolved in advance may be used as the Mo source.

[Baking Process]

Next, the resulting ceramic multilayer structure on which the metal paste for forming the external electrode is baked for ten minutes to 2 hours in a reductive atmosphere in a temperature range of 1100 degrees C. to 1300 degrees C. In this manner, a sintered structure having the multilayer chip 10 having the multilayer structure in which the sintered dielectric layers 11 and the sintered internal electrode layers 12 are alternately stacked and having the cover layers 13 formed as outermost layers of the multilayer chip 10 in the stack direction is obtained.

[Plating Process]

After that, a plating process is performed. Thereby, the Cu-plated layer 22, the Ni-plated layer 23 and the Sn-plated layer 24 are formed on the ground layer 21 in this order. With the processes, the multilayer ceramic capacitor 100 is fabricated.

Figure 4A:
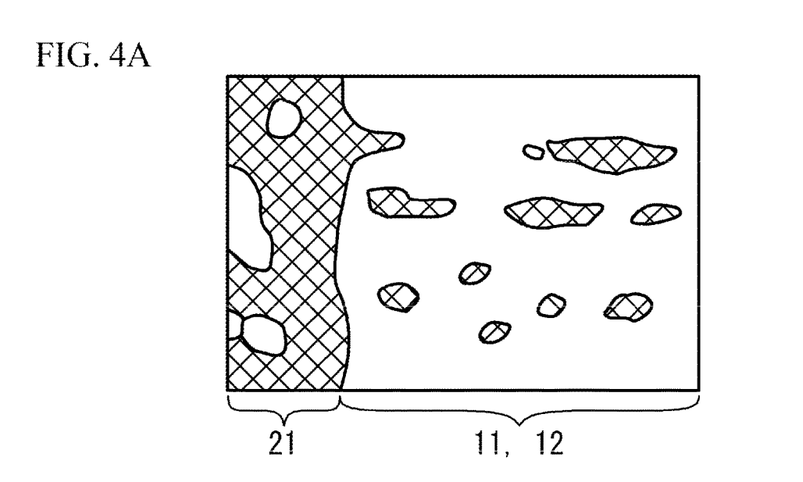
FIG. 4A illustrates a result of Ni distribution measured with use of EPMA.
Figure 4B:
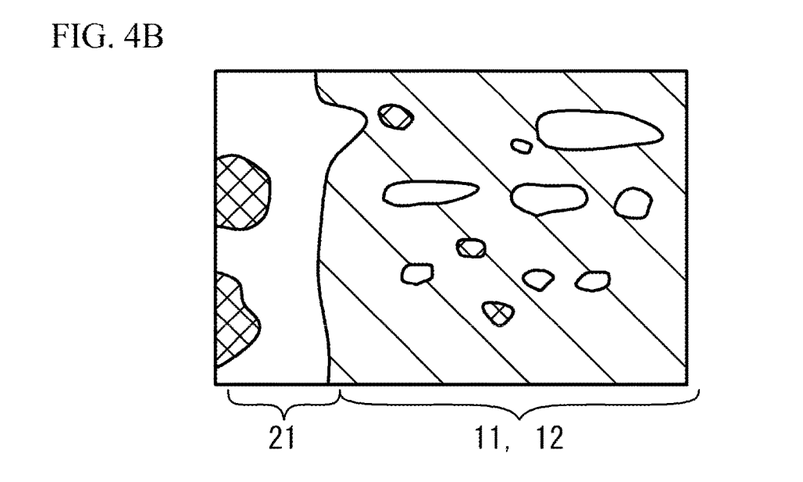
FIG. 4B illustrates a result of Mo distribution measured with use of EPMA.

FIG. 4A illustrates a result of Ni distribution in the ground layer 21, the dielectric layer 11 and the internal electrode layer 12 that are measured with use of EPMA (Electron Probe Micro Analyzer). In FIG. 4A, shading areas are the Ni distribution areas. Areas that are not shaded are areas in which a Ni concentration is low or no Ni is detected. As illustrated in FIG. 4A, the main component of the ground layer 21 is Ni. Therefore, Ni is distributed in an area corresponding to the ground layer 21. And, the main component of the internal electrode layer 12 is Ni. Therefore, Ni is distributed in an area corresponding to the internal electrode layer 12. FIG. 4B illustrates a result of Mo distribution in the ground layer 21, the dielectric layer 11 and the internal electrode layer 12 that are measured with use of EPMA. In FIG. 4B, shading areas are areas in which a Mo concentration is relatively high. A hatching area is an area in which the Mo concentration is relatively low. Areas without shading and hatching is an area in which Mo is not detected.

When FIG. 4A is compared with FIG. 4B, in the area where Ni is distributed, Mo is not detected. And, in the area where Mo is distributed, Ni is not detected. From the result, it is understood that Ni and Mo are not dissolved in each other, and do not form an intermetallic compound, and are independently distributed. It is therefore understood that Mo exists as a single Mo having a very small hydrogen permeability coefficient. Accordingly, it is demonstrated that an intrusion path of hydrogen from the external electrode 20a and 20b is blocked (blocking effect is achieved).

Figure 5A:
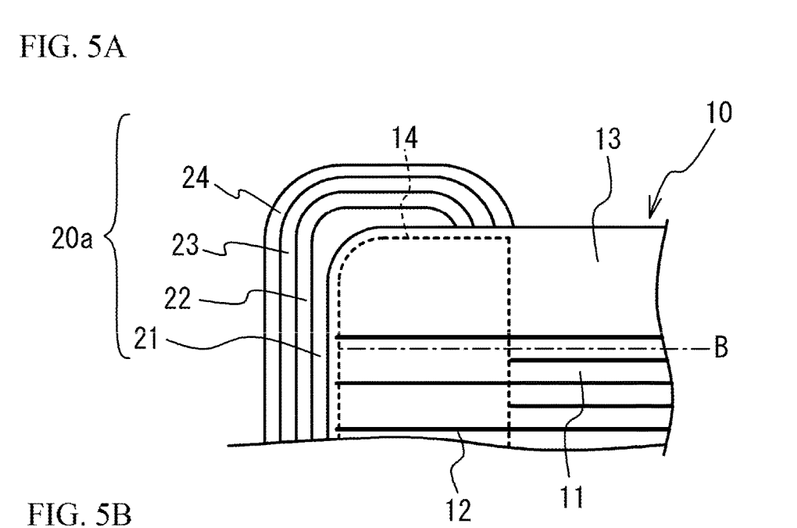
FIG. 5A illustrates measured points.
Figure 5B:
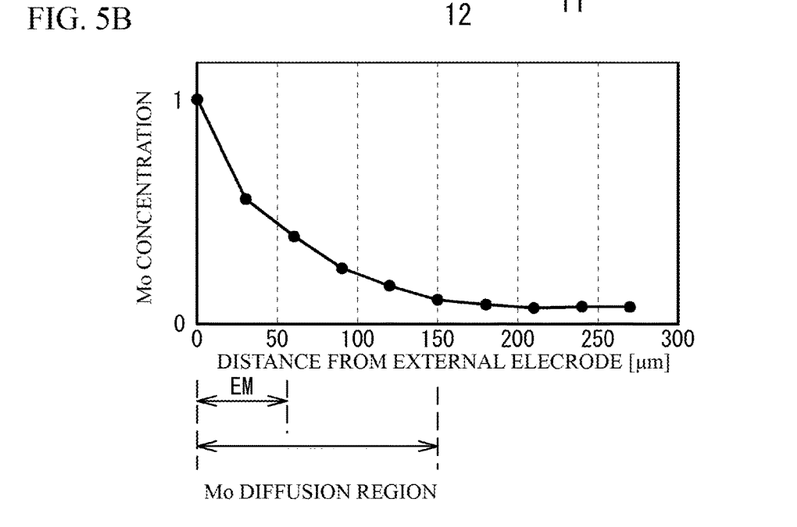
FIG. 5B illustrates measured results of a Mo concentration at a cross section taken along a B line.

Next, a description will be given of a measured result of a Mo concentration in the ceramic region 14 and the capacity region in which internal electrode layers connected to different external electrodes face with each other, with use of laser ablation ICP mass spectrometry. FIG. 5A illustrates measured points. As illustrated in FIG. 5A, the Mo concentration is measured in a cross section taken along a B line in an extension direction of the dielectric layer 11. In FIG. 5B, a horizontal axis indicates a distance from the external electrode in the extension direction of the dielectric layer 11. A vertical axis indicates a normalized value of the Mo concentration. In concrete, the normalized value is calculated by calculating 98Mo/47Ti and converting the concentration on the edge face of the multilayer chip 10 into 1. "98" and "47" are a mass-to-charge ratio of Mo and Ti (m/Z). Therefore, a detected count number of Mo with respect to Ti is detected as the Mo concentration. In FIG. 5B, "EM" is an end margin. In a cross section taken along the B line of FIG. 5A, "EM" is the ceramic region 14. "Mo diffusion region" is a region in which Mo is detected. In the cross section taken along the B line, Mo diffuses from the edge face of the multilayer chip 10 with a concentration gradient. That is, the Mo concentration is the highest at the edge face of the multilayer chip 10. The farer a position from the external electrode along the extension direction of the dielectric layer 11 is, the lower the Mo concentration is. Therefore, it is demonstrated that Mo diffuses from the ground layer 21. And it is demonstrated that the Mo concentration is higher in the ceramic region 14 in which the internal electrode layers connected to the same external electrode face with each other without sandwiching the internal electrode layer 12 connected to a different external electrode than in the region in which the internal electrode layers 12 connected to different external electrodes face with each other.

With the manufacturing method in accordance with the embodiment, the ground layer 21 includes Mo. In this case, when hydrogen is generated in the formation process of the Cu-plated layer 22, the Ni-plated layer 23 and the Sn-plated layer 24, the intrusion of the hydrogen into the internal electrode layer 12 is suppressed. Thus, the adsorption of the hydrogen in the internal electrode layer 12 is suppressed, and the reduction of the dielectric layer 11 is suppressed. Therefore, reduction of the insulating resistance is suppressed. And, when a part of Mo of the ground layer 21 diffuses into the dielectric layer 11, the diffused Mo is replaced with the B site of the perovskite expressed by $ABO_3$ and acts as a donor element. Thus, the generation of the oxygen defect of the ceramic structuring the dielectric layer 11 is suppressed. Accordingly, the reduction resistance of the dielectric layer 11 is enhanced.

The same effect may be achieved in the diffusion of the baking, when the Mo source is not added to the metal paste before forming the external electrode and a film of the Mo source is formed with a sputtering before or after coating the metal paste or both before and after coating the metal paste.

EXAMPLES

The multilayer ceramic capacitors in accordance with the embodiment were made and the property was measured.

Examples 1 to 6

Additive compound was added to barium titanate powder. The resulting barium titanate powder was sufficiently wet blended and was crushed. Thus, the dielectric material was obtained. An organic binder and a solvent were added to the dielectric material. And dielectric green sheets were made by a doctor blade method. A thickness of the dielectric green sheet was 0.8 μm. The organic binder was polyvinyl butyral (PVB) resin or the like. The solvent was ethanol, toluene or the like. And a plasticizer and so on were added. Next, the conductive paste for forming the internal electrode layer was made by mixing powder acting as a main component metal of the internal electrode layer 12, a binder, a solvent and an additive as needed. The organic binder and the solvent were different from those of the dielectric green sheet. The conductive paste was screen-printed on the dielectric sheet. 250 of the dielectric green sheets on which the conductive paste for forming the internal electrode layer were stacked, and cover sheets were stacked on the stacked dielectric green sheets and under the stacked dielectric green sheets. After that, a ceramic multilayer structure was obtained by a thermal compressing. And the ceramic multilayer structure was cut into a predetermined size.

The binder was removed from the ceramic multilayer structure in $N_2$ atmosphere. After that, a metal paste including a metal filler of which a main component is Ni, a co-material, a binder, a solvent and a Mo source was coated from the both edge faces of the ceramic multilayer structure to each side face and was dried. $MoO_3$ was used as the Mo source. In the example 1, $MoO_3$ wad added so that the concentration of $MoO_3$ with respect to the solid content of the metal paste was 0.1 wt %. In the example 2, $MoO_3$ wad added sot that the concentration of $MoO_3$ with respect to the solid content of the metal paste was 0.2 wt %. In the example 3, $MoO_3$ was added so that the concentration of $MoO_3$ with respect to the solid content of the metal paste was 0.3 wt %. In the example 4, $MoO_3$ was added so that the concentration of $MoO_3$ with respect to the solid content of the metal paste was 0.5 wt %. In the example 5, $MoO_3$ was added so that the concentration of $MoO_3$ with respect to the solid content of the metal paste was 1.0 wt %. In the example 6, $MoO_3$ was added so that the concentration of $MoO_3$ with respect to the solid content of the metal paste was 3.0 wt %. After that, the metal paste was baked together with the ceramic multilayer structure for 10 minutes to two hours in a reducing atmosphere within a temperature range of 1100 degrees C. to 1300 degrees C., and a sintered structure was formed.

The length, the width and the height of the sintered structure were respectively 0.6 mm, 0.3 mm and 0.3 mm. The sintered structure was re-oxidized in $N_2$ atmosphere at 800 degrees C. After that, the Cu-plated layer 22, the Ni-plated layer 23 and the Sn-plated layer 24 were formed on the surface of the ground layer 21 by plating. And the multilayer ceramic capacitor 100 was fabricated. 100 samples of the examples 1 to 6 were made.

Comparative Example 1

In a comparative example 1, the Mo source was not added to the metal paste for the ground layer 21. Other conditions were the same as those of the examples 1 to 6. 100 samples of the comparative example 1 were manufactured.

A withstand test was performed with respect to the examples 1 to 6 and the comparative example 1. In the withstand test, a temperature was 85 degrees C., a relative humidity was 85%, an applied voltage was 10V, and a time was 100 h. In this case, an incidence rate of samples of which resistance was 100 MΩ or less for 60 seconds was measured. Table 1 shows results. As shown in Table 1, in the comparative example 1, the incidence rate becomes higher and was 18% or more. This is because hydrogen permeated the ground layer 21 and was adsorbed in the internal electrode layer 12, and the dielectric layer 11 was reduced by the hydrogen. On the other hand, in the examples 1 to 6, the incidence rate was largely reduced. This is because the hydrogen permeation of the ground layer 21 was suppressed, and the hydrogen adsorption into the internal electrode layer 12 was suppressed.

TABLE 1

| | $MoO_3$ wt % | INCIDENCE RATE OF 85° C.-85%-10 V-100 h 60 s-100 MΩ OR LESS |
|---|---|---|
| EXAMPLE 1 | 0.1 | 2% |
| EXAMPLE 2 | 0.2 | 1% |
| EXAMPLE 3 | 0.3 | 0% |
| EXAMPLE 4 | 0.5 | 0% |
| EXAMPLE 5 | 1.0 | 0% |
| EXAMPLE 6 | 3.0 | 0% |
| COMPARATIVE EXAMPLE 1 | 0.0 | 18% |

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
a multilayer chip having a parallelepiped shape in which each of a plurality of dielectric layers and each of a plurality of internal electrode layers are alternately stacked and are alternately exposed to two edge faces of the multilayer chip, a main component of the plurality of dielectric layers being a ceramic; and
a pair of external electrodes that are formed on the two edge faces;
wherein:
the pair of external electrode have a structure in which a plated layer is formed on a ground layer;
a main component of the ground layer is a metal or an alloy including at least one of Ni and Cu;
the ground layer includes Mo; and
a Mo concentration of the dielectric layer has a concentration gradient in which the Mo concentration gradually decreases from the two edge faces to an inward of the dielectric layer.

2. The multilayer ceramic capacitor as claimed in claim 1, wherein the Mo concentration in the dielectric layer is higher in a region in which internal electrode layers connected to a same external electrode face with each other without sandwiching an internal electrode layer connected to a different external electrode than in a region in which internal electrode layers connected to different external electrodes face with each other.

3. The multilayer ceramic capacitor as claimed in claim 1, wherein the plated layer includes a Sn-plated layer.

4. The multilayer ceramic capacitor as claimed in claim 1, wherein a main metal of the ground layer is Ni.

5. The multilayer ceramic capacitor as claimed in claim 1, wherein a main component of the internal electrode layer is Ni.

6. The multilayer ceramic capacitor as claimed in claim 1, wherein the ceramic of the dielectric layer has a perovskite structure.

7. A multilayer ceramic capacitor comprising:
a multilayer chip having a parallelepiped shape in which each of a plurality of dielectric layers and each of a plurality of internal electrode layers are alternately stacked and are alternately exposed to two edge faces of the multilayer chip, a main component of the plurality of dielectric layers being a ceramic; and
a pair of external electrodes that are formed on the two edge faces;
wherein:
the pair of external electrode have a structure in which a plated layer is formed on a ground layer;
a main component of the ground layer is a metal or an alloy including at least one of Ni and Cu;
the ground layer includes Mo; and
a Mo concentration in the dielectric layer is higher in a region in which internal electrode layers connected to a same external electrode face with each other without sandwiching an internal electrode layer connected to a different external electrode than in a region in which internal electrode layers connected to different external electrodes face with each other.

8. The multilayer ceramic capacitor as claimed in claim 7, wherein the Mo concentration of the dielectric layer has a concentration gradient in which the Mo concentration gradually decreases from the two edge faces to an inward of the dielectric layer.

9. The multilayer ceramic capacitor as claimed in claim 7, wherein the plated layer includes a Sn-plated layer.

10. The multilayer ceramic capacitor as claimed in claim 7, wherein a main metal of the ground layer is Ni.

11. The multilayer ceramic capacitor as claimed in claim 7, wherein a main component of the internal electrode layer is Ni.

12. The multilayer ceramic capacitor as claimed in claim 7, wherein the ceramic of the dielectric layer has a perovskite structure.

* * * * *